TRANSMITTING ARRANGEMENTS FOR THE TRANSMISSION OF AMPLITUDE MODULATED OSCILLATIONS

Filed April 1, 1966 2 Sheets-Sheet 1

INVENTOR.
THEODORUS J. VAN KESSEL
BY
[signature]
AGENT

INVENTOR.
THEODORUS J. VAN KESSEL
BY
AGENT

United States Patent Office 3,409,832

Patented Nov. 5, 1968

3,409,832

TRANSMITTING ARRANGEMENTS FOR THE TRANSMISSION OF AMPLITUDE MODULATED OSCILLATIONS

Theodorus Jozef van Kessel, Emmasingel, Eindhoven, Netherlands, assignor to North American Philips Company Inc., New York, N.Y., a corporation of Delaware Filed Apr. 1, 1966, Ser. No. 539,380
Claims priority, application Netherlands, Apr. 17, 1965, 6504930
6 Claims. (Cl. 325—137)

ABSTRACT OF THE DISCLOSURE

A compatible single sideband transmitter of the type in which information signals are modulated on carrier oscillations to produce a first single sideband signal, the first single sideband signals are frequency doubled and amplitude limited, and the limited oscillations are amplitude modulated by the information signals to produce an output single sideband signal. In order to reduce spurious sideband signals, single sideband signals of the information signals modulated on the carrier oscillations are applied to an amplitude modulator, wherein they are multiplied by themselves to produce signals in the band of the information signals. These latter signals are then modulated on oscillations at twice the carrier frequency, and added to the signals applied to the amplitude limiter.

Figure 1:
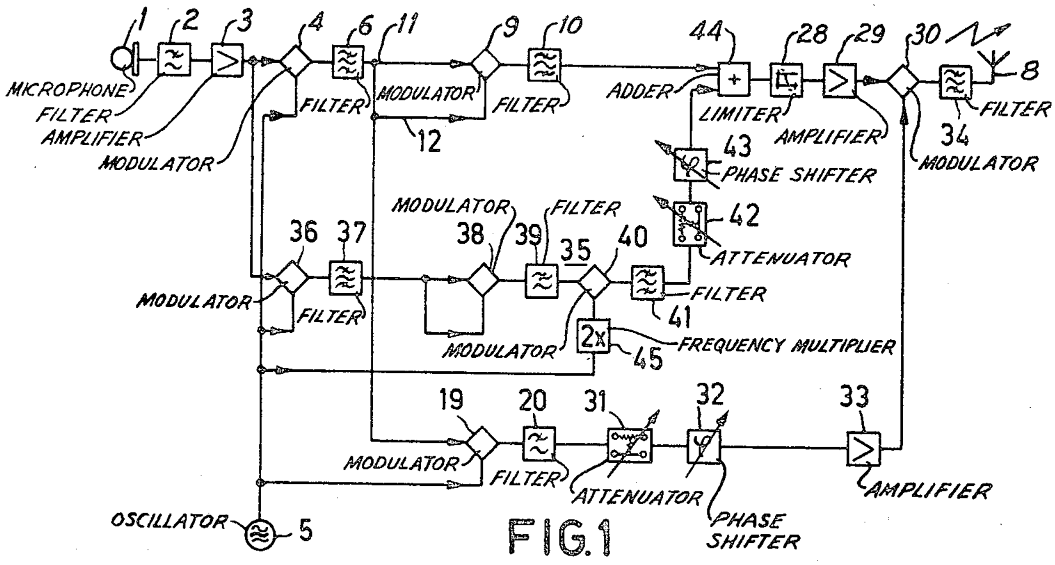

U. S. Patent No. 3,274,492, filed Apr. 9, 1962 relates to a transmitting arrangement for the transmission of amplitude modulated oscillations in which the information content is concentrated substantially in one side-band. This transmitting arrangement comprises a first amplitude modulator fed with signals to be transmitted and including an associated carrier oscillator and an output filter, the carrier oscillation and one of the side-bands for the further transmission being derived from the first amplitude modulator. The signal derived from the first amplitude modulator is modulated with itself in a second amplitude modulator, the transmitting arrangement also including an output filter which passes only the frequency band at twice the carrier frequency, the signals from the second amplitude modulator being applied to an amplitude limiter and the signals of constant amplitude originating from the amplitude limiter being applied as a carrier oscillation to an output modulator stage, and the signals to be transmitted being applied as a modulating voltage to this output modulator. A system of this type is also disclosed in U.S. Patent No. 3,295,072 filed Dec. 23, 1963.

As has been explained in detail in Patent No. 3,274,492, such a transmitting arrangement may advantageously be used for broadcast purposes since, on the one hand, the signals transmitted by the transmitting arrangement can be detected with excellent quality of reproduction in an ordinary amplitude modulator and, on the other hand, with the transmitting power unchanged, the emitted power of the information signals is raised considerably with respect to the power of the carrier wave and also a considerable saving in bandwidth is obtained since the information content of the transmitted signals is concentrated substantially in one side-band. Signal components which still occur outside the relevant side-band are found to occur only with a considerable degree of attenuation.

An object of the invention is to attenuate still further these frequency components located outside the relevant side-band in a very simple manner so that, together with a reduction of the mutual influencing of neighbouring transmitters, the quality of reproduction is also improved.

An arrangement according to the invention is characterized in that the input of the limiter stage has connected to it an additional correcting device by which the distortion products occurring upon amplitude detection of the output signal from the second amplitude modulator are applied, modulated at twice the carrier frequency, in phase opposition to the input of the limiter.

A very advantageous embodiment which is distinguished by simplicity in construction and adjustment is characterized in that the correcting device comprises an amplitude modulator which modulates with itself a single side-band signal of the information signals with suppressed or reduced carrier wave applied to this amplitude modulator, followed by a low-pass filter and a push-pull modulator to which the carrier oscillation from the carrier oscillator associated with the first modulator stage is also applied through a frequency doubler, the output circuit of the push-pull modulator being connected to the input of the limiter.

Figure 4:
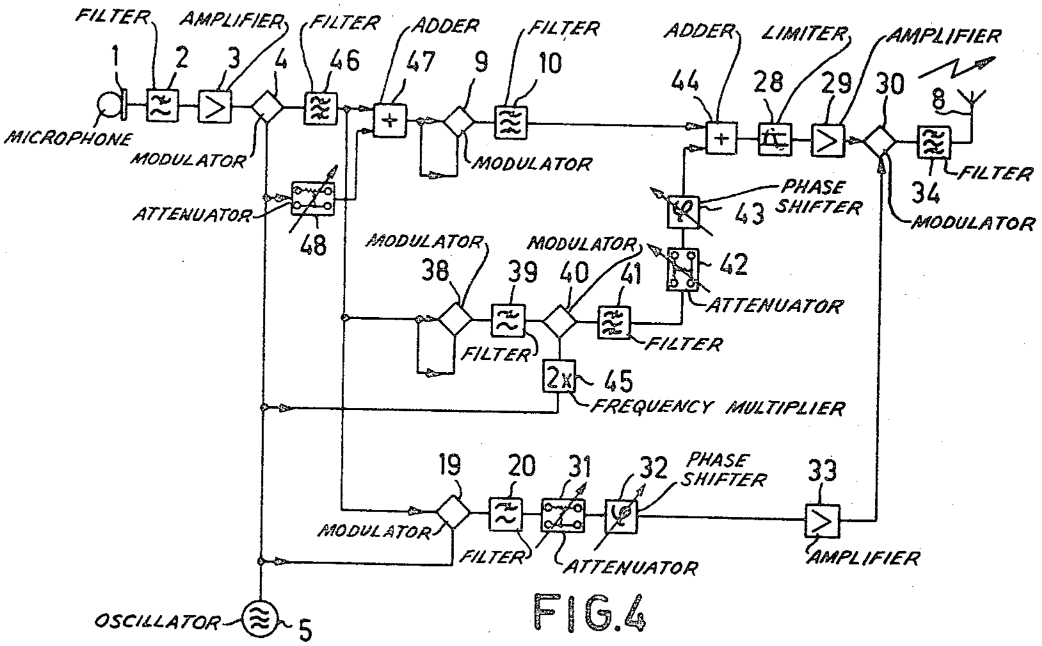

In order that the invention may be readily carried into effect, it will now be described in detail, by way of example, with reference to the accompanying diagrammatic drawings, in which:

FIGURE 1 shows a block diagram of an arrangement according to the invention;

FIGURES 2*a*–2*f* and FIGURES 3*a*–3*d* show several diagrams which serve to explain the arrangement according to the invention, and FIGURE 4 shows a simplification of the arrangement of FIGURE 1.

In the transmitting arrangement according to the invention as shown in FIGURE 1 for the transmission of audio signals, for example music or speech signals in the band from 30 c./s. to 9,000 c./s., signals originating from a microphone 1 are applied through a lowpass filter 2 and a low-frequency amplifier 3 to a modulator stage 4 having a carrier oscillator 5 of, for example, 400 kc./s. The upper sideband located in the band from 4,000.030 kc./s. to 4,009 kc./s. is derived, together with the carrier oscillation, from the output circuit of the amplitude modulator stage 4 with the use of a filter 6.

The specified single side-band transmission with co-transmitted carrier oscillation affords, as compared with ordinary amplitude modulation, the advantages that, with the power of the transmitter unchanged, the power of the information signals may be raised considerably, this permitting a saving in frequency to be obtained, but this is off set by the fact that considerable signal distortion occurs, for example approximately—50 db with a modulation index of 0.7, if the oscillations transmitted by the transmitting arrangement are received in an ordinary amplitude modulation receiver. In Patent No. 3,274,492 this signal distortion is greatly reduced upon reception in an ordinary amplitude modulation received by the steps specified in said patent so that the above-mentioned advantages are accompanied by an excellent quality of reproduction upon reception in an ordinary amplitude-modulation receiver.

To this end, as a first step in Patent No. 3,274,492 the amplitude modulator 4 is followed by a second amplitude modulator 9 in which the signal derived as a carrier oscillation from the first mentioned amplitude modulator 4 is modulated in amplitude by the same signal to a modulating signal, the transmitting arrangement including an output filter 10 which passes only the signals located in the signal band at twice the carrier frequency. To this end, in the embodiment described, the signal derived from the amplitude modulator 4 is applied, on the one hand, as a carrier oscillation through a lead 11 and, on the other hand, as a modulating signal through a lead 12 to the amplitude modulator 9. It will be understood, of course, that the amplitude modulation in the modulator 4 is a multiplication process, and any device which multiplies the signal by the same signal (i.e. by itself) may be employed. The signals applied to the multiplying device may have the same phase, or as pointed out in Patent No. 3,274,492, they may alternatively have a relative phase shift. When the signals have the same phase, a single input multiplier such as a squarer may be employed. Thus, as employed in this application, the multiplying of signals "by themselves" refers to the multiplication process whereby a signal is multiplied either by an identical signal or the same signal in phase shifted form.

Figure 2A:
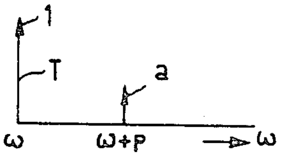
Figure 2B:
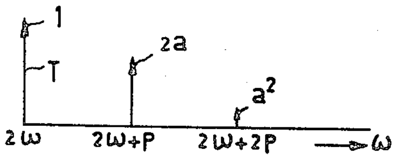

If, for example, the output signal from the amplitude modulator 4 comprises a carrier T of amplitude 1 and of frequency $\omega$ and also a signal sideband of amplitude $a$ and of frequency $(\omega+p)$, this signal given by the formula $\cos \omega t+a \cos (\omega+p)t$ is modulated with itself in the amplitude modulator 9, thus resulting in a signal $\frac{1}{2} \cos 2\omega t+a \cos (2\omega+p)t+\frac{1}{2}a^2 \cos (2\omega+2p)t$ at twice the carrier frequency which signal is passed by the output filter 10. By way of illustration FIGURE 2*a* shows the frequency spectrum of the output signal from the amplitude modulator 4 and FIGURE 2*b* shows the frequency diagram of the output signal from the amplitude modulator 9, the amplitude of the carrier oscillation which has the frequency $2\omega$ again being reduced to unity.

Figure 2C:
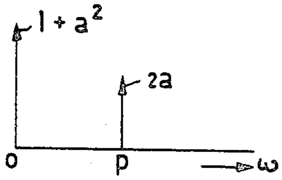

In Patent No. 3,274,492 it has already been explained that, due to the very simple step specified, the quality of reproduction is improved considerably upon reception of signals emitted by the amplitude modulator 9 in an ordinary amplitude modulation receiver. In fact, when the envelope of the signal shown in FIGURE 2*b* is calculated in the manner explained in the main patent, this envelope may be represented mathematically by the formula:

$$\sqrt{(1+2a \cos pt+a^2 \cos 2pt)^2+(2a \sin pt+a^2 \sin 2pt)^2}$$

which, after reduction gives:

$$1+a^2+2a \cos pt$$

that is to say that, upon reception in an ordinary amplitude modulation receiver, the transmitted signal is restored free from distortion. For the sake of completeness, FIGURE 2*c* shows the frequency spectrum of the enveloping signal.

Figure 2D:
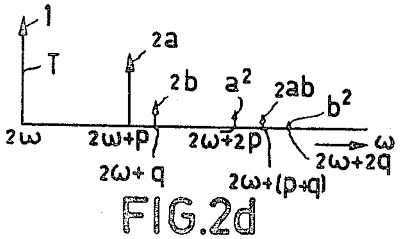
Figure 2E:
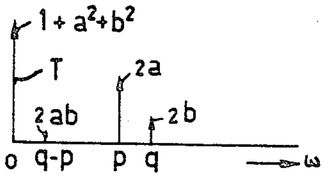
Figure 2F:
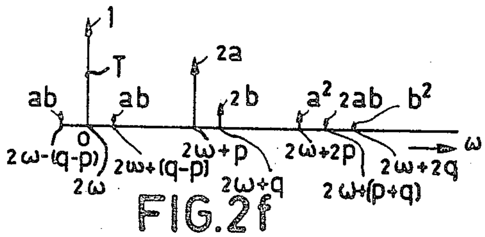
Figure 3A:
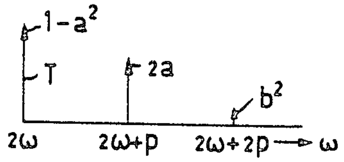
Figure 3B:
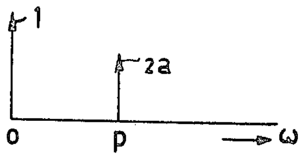
Figure 3C:
Figure 3D:
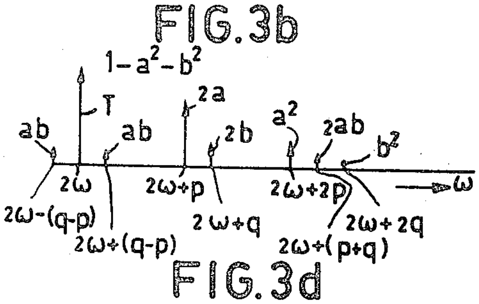

Thus, when listening to the transmitted signals in an ordinary amplitude modulation receiver, a considerable improvement in the quality of reproduction was already obtained, but signal distortion still appears to occur, although reduced to a considerable extent, which is caused by intermodulation products if a plurality of frequency components are present in the transmitted signals simultaneously. For example, if two components of amplitudes $a$ and $b$ and of frequencies $p$ and $q$ are transmitted simultaneously. FIGURE 2*d* shows the frequency spectrum of the output signal from the amplitude modulator 9 and FIGURE 2*e* shows the frequency spectrum of the enveloping signal. From FIGURE 2*e* it may be seen that, when listening to the signals emitted by the amplitude modulator 9 in an ordinary amplitude modulation receiver, not only the desired components $2a$ and $2b$ and frequencies $p$ and $q$ occur but also a second order distortion term $2ab$ of frequency $q-p$ which in the most unfavourable case is −25 db.

According to the further steps in Patent No. 3,274,492, these remaining distortion products are reduced further by limiting the output signal from the amplitude modulator 9 to a constant value in an amplitude limiter 28 and applying this limited signal of constant amplitude, after amplification in an amplifier 29, as a carrier oscillation to an output modulator 30 the modulating signal of which is formed by the audio-frequency signal to be transmitted which is derived from a synchronous demodulator 19 connected to the modulator stage 4. For synchronous demodulation the carrier oscillator 5 is connected to the demodulator 19, the audio-frequency signal obtained by synchronous demodulation being applied through a low-pass filter 20, and adjustable amplitude control 31 and an adjustable phase-shifting network 32, after amplification in an amplifier 33, as a modulating signal to the output modulator 30. The amplitude-modulated signal thus derived from the output modulator 30 is emitted by a transmitting aerial 8 through an output network 34.

The signal limited in the amplitude limiter 28 is modulated by the original audio-frequency signal in the output modulator 30, that is to say the enveloping signal of the signal emitted by the modulator 9 is replaced by the original low-frequency signal in the output modulator 30 so that the envelope of the oscillations modulated in the output modulator 30 has acquired the waveform desired for distortionless reception in an ordinary amplitude modulation receiver. In the frequency spectrum transmitted, the described modulating process, for example, upon simultaneous transmission of the components $a$ and $b$, results in that the frequency spectrum of FIGURE 2*d* has added to it the two second order terms (see FIGURE 2*f*) of amplitude $ab$ and frequencies $2\omega-(q-p)$ and $2\omega+(q-p)$ and also higher order terms, not shown in FIGURE 2*f*, which partly fall outside the desired band of frequencies. Apart from the fact that these higher order terms located outside the desired band of frequencies act upon neighbouring transmitters, it is very important to reduce the level of these higher order terms for obtaining optimum quality or reproduction in an ordinary amplitude modulation receiver. In fact, the spectrum components within the passband of the ordinary amplitude modulation receiver determine the restored enveloping signal which exactly corresponds to the original low-frequency signal only if all of the spectrum components are received.

An object of the invention is to minimize these higher order components located outside the signal band and, according to the invention, this object is attained in that the input of the limiter stage 28 has connected to it an additional correcting device 35 by which the distortion products occurring upon amplitude modulation of the output signal from the second amplitude modulator 9 are applied, modulated at twice the carrier frequency of the carrier oscillator 5 connected to the first amplitude modulator 4, in phase opposition to the input of the limiter 28.

A correcting device which is very interesting in practice comprises an amplitude modulator 36 fed by the signals to be transmitted and a subsequent single sideband filter 37 for producing a single sideband signal with suppressed carrier wave, followed by a second amplitude modulator 38 which modulates with itself the single sideband signal derived from the preceding amplitude modulator 36 and which includes an output filter in the form of a low-pass filter 39 which passes the signals in the audio-frequency signal band for further use. The output signal from the amplitude modulator, after modulation in a push-pull modulator 40 having an output filter 41, is added at a carrier frequency $2\omega$ corresponding to the output signal from the modulator stage, through an adjustable amplitude control 42 and an adjustable phase-shifting network 43, with the correct phase and amplitude to the output signal from the amplitude modulator 9 in an adding device 44. In the embodiment described, the limiting frequency of the low-pass filter 39 is, for example, 9 kc./s. and the carrier oscillator 5 is connected directly to the amplitude modulator 36 and, through a frequency-doubling device 45, to the amplitude modulator 40.

As has already been explained in the foregoing, upon transmission of a single audio-frequency $p$ and amplitude $a$ no distortion products occur when the output signal from the modulator 9 is received in an ordinary amplitude modulation receiver. In this case the single audio-frequency $p$ is transposed in frequency in the amplitude modulator 36 through a single sideband filter 37 and modulated with itself in the amplitude modulator 38, resulting in a direct voltage at the output of the low-pass filter 39 which is proportional to the square of the amplitude $a$ of the audio-frequency signal, which direct voltage is converted into a proportional carrier signal of frequency $2\omega$ in the amplitude modulator 40 and added through the amplitude control 42 and the phase-shifting network 43 to the output signal of the amplitude modulator 9 in the adding device 44. The frequency spectrum at the output of the adding device 44 then corresponds to FIGURE 3$a$ and the associated frequency spectrum of the enveloping signal to FIGURE 3$b$.

Upon simultaneous transmission of a plurality of audio-frequencies, for example, a second audio-frequency $q$ and amplitude $b$ in addition to the audio-frequency $p$ and amplitude $a$, an output signal is obtained in the amplitude modulator 38, as shown in FIGURE 3$c$, by modulation with itself of the single sideband signal with suppressed carrier wave, said output signal being constituted by a direct voltage proportional to the sum of the squares of the amplitudes $a$ and $b$ and a second order intermodulation product which is exactly equal in frequency $(q-p)$ and in amplitude $(2ab)$ to the distortion product when the output signals from the amplitude modulator 9 are received in an ordinary amplitude modulation receiver (see FIGURE 2$e$). If the output signal produced in the amplitude modulator 38 is thus modulated on the carrier frequency $2\omega$ in the amplitude modulator 40 and added through the amplitude control 42 and the phase-shifting network 43 in phase opposition and with the correct amplitude to the output signal from the amplitude modulator 9 in the adding device 44, it is achieved that distortion upon reception in an ordinary amplitude modulation receiver is reduced. FIGURE 3$d$ shows the frequency spectrum at the output of the adding device 44, if two side-band frequencies $2\omega-(q-p)$ and $$2\omega+(q-p)$$

of amplitude $ab$ are transmitted in addition to the frequency spectrum emitted by the amplitude modulator 9 (see FIGURE 2$d$).

A signal is thus formed in the adding device 44 for producing, after limitation in the limiter 28, the carrier oscillation for the amplitude modulator 30 which signal, in the absence of third and higher order components in the frequency spectrum, has an enveloping signal which already gives a second order approximation of the audio-frequency signals to be transmitted. As before, the enveloping signal is given the exact waveform in the amplitude modulator 30, but during this process an excessive reduction in the level of the third and higher order frequency components, and hence of the frequency components located outside the relevant sideband, occurs. In fact the level of these higher order components decreases, as a result of the non-linear processes in the limiter 28 and the amplitude modulator 30, in a progressive manner with the difference in waveform between the envelope of the signals applied to the limiter 38 and the original audio-frequency signals, which difference in form has just been minimized by using the steps according to the invention. For example, the level of the frequency components located outside the relevant sideband with 80% modulation index was reduced with respect to the carrier wave by a factor of −50 db.

With minimum influencing of neighboring transmitters, the arrangement according to the invention is distinguished by optimum quality of reproduction upon reception in an ordinary amplitude modulation receiver, whilst the equipment used appears to be very simple as regards construction as well as adjustment. Furthermore, the arrangement described affords the possibility that, on the one hand, the equipment may be simplified still further, as will be explained with reference to FIGURE 4 and, on the other hand, that the transmitted signal may be given a substantially pure single sideband character. For this purpose, of the two sidebands $2\omega-(q-p)$ and $2\omega+(q-p)$ produced in the amplitude modulator 40, the sideband $2\omega-(q-p)$ is suppressed by means of a filter and the other sideband $2\omega+(q-p)$ is doubled in amplitude. In fact, in this case also the envelope of the signals occurring in the adding device 44 provides a second order approximation of the original audio-frequency signals.

FIGURE 4 shows a simplified form of the arrangement of FIGURE 1. In this example, the amplitude modulator 4 is of the push-pull type and an output filter 46 is formed by a single sideband filter, the single sideband signal with suppressed carrier wave derived from the single sideband filter 46 being applied to the amplitude modulator 38 and with the interposition of an adding device 47 to which the carrier oscillator 5 is also connected through an adjustable amplitude control 48 to the amplitude modulator 9. Thus, as in the arrangement of FIGURE 1, with the use of only one amplitude modulator 4, a single sideband signal with co-transmitted carrier oscillation is applied to the amplitude modulator 9 and a single sideband signal with suppressed carrier oscillation is applied to the amplitude modulator 38, the operation of this arrangement otherwise exactly corresponding to that of FIGURE 1.

In this way not only the amplitude modulator 36 and its output filter 37 is economized, but it is also achieved that the single sideband signals applied to the amplitude modulators 9 and 38 are identical, which is very important for accurate adjustment of the equipment. Lastly, it should be noted that it is not strictly necessary to apply a single sideband signal to the amplitude modulator 38 with completely suppressed carrier, it already being sufficient to reduce the amplitude of the carrier oscillation being passed.

What is claimed is:

1. A transmitter for transmitting single sideband signals comprising a source of information signals, a source of a carrier wave oscillation of a first frequency, means for modulating said oscillation with said information signals to produce a first single sideband signal including said carrier wave oscillations, means for multiplying said first single sideband signals by themselves to produce second single sideband signals at twice said first frequency including carrier oscillations at twice said first frequency, means for producing correction signals, means for adding said second single sideband signals and correction signals, means for amplitude limiting the output of said adding means, and output circuit means including means for modulating the output of said limiting means with said information signals, said means for producing correction signals comprising second multiplying means having an input circuit, means for applying single sideband signals of said information signals modulated on carrier wave oscillations of said first frequency to said input circuit, whereby said last mentioned signals are multiplied by themselves, means for deriving multiplied signals within the band of said information signals from said second multiplying means, and means for modulating said multiplied signals on carrier oscillations of twice said first frequency to produce said correction signals.

2. The transmitter of claim 1 in which said single sideband signals applied to said input circuit have a suppressed carrier, and said means for modulating said multiplied signals on carrier oscillations of twice said first frequency comprises frequency doubling means for doubling said carrier wave oscillations of said first frequency, push-pull modulator means, and means applying said multiplied signals and the output of said doubling means to said push-pull modulator means.

3. The transmitter of claim 1 in which said single sideband signals applied to said input circuit have a reduced carrier, and said means for modulating said multiplied signals on carrier oscillations of twice said first frequency comprises frequency doubling means for doubling said carrier wave oscillations of said first frequency, push-pull modulator means, and means applying said multiplied signals and the output of said doubling means to said push-pull modulator means.

4. The transmitter of claim 1 wherein said means for applying single sideband signals to said input circuit comprises second means for amplitude modulating said carrier wave oscillations of first frequency with said information signals to produce single sideband signals with suppressed carrier, and means applying the output of said second amplitude modulating means to said input circuit.

5. The transmitter of claim 1 wherein said means for producing said first single sideband signal including said carrier wave oscillations comprises a push-pull modulator, means applying said information signals and carrier wave oscillations to said push-pull modulator, second adding means, and means for adding the output of said push-pull modulator and said carrier wave oscillations to produce said first single sideband signals, and said means applying single sideband signals to said input circuit comprises means applying the output of said push-pull modulator to said input circuit.

6. The transmitter of claim 1 comprising single sideband filter means for applying said correction signals to said adding means.

References Cited

UNITED STATES PATENTS

| | | | |
|---|---|---|---|
| 2,989,707 | 6/1961 | Kahn | 332—45 |
| 3,323,064 | 5/1967 | Remley | 325—137 |

ROBERT L. GRIFFIN, *Primary Examiner.*

B. V. SAFOUREK, *Assistant Examiner.*

UNITED STATES PATENT OFFICE

CERTIFICATE OF CORRECTION

Patent No. 3,409,832 November 5, 1968

Theodorus Jozef van Kessel

It is certified that error appears in the above identified patent and that said Letters Patent are hereby corrected as shown below:

Column 2, line 37, "4000.030" should read -- 400,030 --.

Signed and sealed this 17th day of March 1970.

(SEAL)
Attest:

Edward M. Fletcher, Jr.
Attesting Officer

WILLIAM E. SCHUYLER, JR.
Commissioner of Patents